United States Patent [19]

Slacter

[11] 4,186,511
[45] Feb. 5, 1980

[54] FISH LURE HOLDER

[76] Inventor: Alan W. Slacter, 2840 Webster Ave. South, St. Louis Park, Minn. 55426

[21] Appl. No.: 848,409

[22] Filed: Nov. 4, 1977

[51] Int. Cl.² ............................................. A01K 97/06
[52] U.S. Cl. ............................ 43/57.5 R; 224/42.46 R
[58] Field of Search ...................... 43/57.5 R; 206/315; 224/42.46 R, 42.45 R, 5 G, 29 R

[56] References Cited

U.S. PATENT DOCUMENTS

| 140,416 | 7/1873 | Hipkiss | 224/42.46 R |
|---|---|---|---|
| 2,316,833 | 4/1943 | Baron | 43/57.5 R |
| 2,610,430 | 9/1952 | Neiman | 43/57.5 R |
| 2,713,807 | 7/1955 | Herbert | 43/57.5 R |
| 2,978,830 | 4/1961 | Killian | 43/57.5 R |
| 3,377,737 | 4/1968 | Campbell | 43/57.5 R |
| 3,461,599 | 8/1969 | Sylvester | 43/57.5 R |
| 3,769,741 | 11/1973 | Hessler | 43/57.5 R |

Primary Examiner—Nicholas P. Godici
Attorney, Agent, or Firm—Merchant, Gould, Smith, Edell, Welter & Schmidt

[57] ABSTRACT

A fishing lure box designed to be secured to the side of a boat to hold a plurality of fishing lures within convenient reach of a fisherman. The lure box includes a block of elastomeric material into which the hooks of fishing lures are removably inserted. The block of elastomeric material is affixed to a frame having a pair of resilient clip arms that hold the box securely against the side of the boat on the inside of the boat.

4 Claims, 4 Drawing Figures

FISH LURE HOLDER

BACKGROUND OF THE INVENTION

The present invention relates broadly to fishing lure boxes and, in particular, to fishing lure boxes designed to be secured to the side of a boat to hold fishing lures in a position conveniently accessible to a fisherman.

In various types of fishing, it is not uncommon for a fisherman to use a number of different fishing lures to accommodate different conditions and/or to find the lure that happens to be the most effective on a given day. When fishing from small boats, i.e., canoes or similar watercraft with limited interior space, it is desirable to store a plurality of lures in a place and manner such that the lures are conveniently accessible to the fisherman while also requiring a minimum amount of interior boat space. Presently, it is common practice to have lures lying about the boat where they may create a hazard to the boat occupants. If the lures are kept within a conventional tackle box within the boat, the fisherman frequently has to search through the cluttered contents of the box to find the desired lure.

The U.S. Pat. to Baron No. 2,316,833 discloses a tackle box having a plurality of individual compartments, each compartment having a supporting rod about which the hook of a fishing lure is placed to retain the lure within the individual compartment. The box is provided with a pair of rods hinged to the box, each rod having a curved hook portion which loosely fits over the side of a boat. The tackle box disclosed in the patent to Baron has a number of disadvantages. For example, the capacity of the tackle box is limited by the number of individual fishing lure compartments. Also the width or size of the individual compartments may be such that large lures would not fit within the Baron box. Additionally, since the tackle box is merely loosely hooked to the side of the boat, there is the possibility that the box could be inadvertently jarred and knocked to the floor of the boat or even overboard. The fisherman must be careful to insure that he replaces the lures securely on the lure supporting rods so that the lures will not fall from their supports and become entangled in the bottom of the boat in the event that the boat is subjected to water turbulence.

It is also known in the prior art to secure fishing lures and hooks in foam material. A number of prior art lure carriers utilize foam material as a lure support. These prior art lure carriers are typically either small carriers designed to be attached to the belt or arm of the fisherman or relatively bulky tackle boxes which would occupy significant floor space of a small boat. The smaller lure carriers have a disadvantage of limited lure capacity.

The present invention overcomes the disadvantages of the prior art in that it is a fishing lure box designed to be firmly secured to the side of a boat and which has a block of elastomeric material into which the hooks of fishing lures are removably attached. The lure box of the present invention is provided with resilient clip arms which hold the lure box firmly against the side of the boat eliminating the hazards of accidentally jarring the lure box from its position on the side of the boat. The fishing lures are easily placed in and removed from the elastomeric material and held firmly therein so that the lures cannot be jarred from their support in turbulent water. The present invention includes an integrally molded plastic box that may be inexpensively manufactured and sold at relatively low retail prices. Each fisherman in the boat could have his or her own lure box secured to the boat. The lure box may simply be left in place on the boat after a particular fishing excursion once the fisherman has removed the lures from the box. The fisherman does not have to transport the lure box back and forth from his dwelling to the boat upon each instance of use.

SUMMARY OF THE INVENTION

The present invention is a fishing lure box adapted to be secured to the side of a boat for retaining fishing lures having hooks in a position inside a boat easily accessible to the fisherman. The box includes a frame with a substantially planar base member. The base member has top and bottom ends and front and rear surfaces. A lure support member of elastomeric material is affixed to the front surface of the planar base member so that hooks of the fishing lures may be removably inserted within the elastomeric material. Resilient clip means are affixed to the lure box frame for securing the frame to the side of the boat whereby the fishing lures that are not in use are conveniently accessible to the fisherman.

In a preferred embodiment, the clip means includes resilient clip arms each having a first end affixed to the frame and a free second end. The clip arm has an unstressed state in which the free end is biased against the rear surface of the base member and a stressed state wherein the side of the boat is placed between the clip arm and the rear surface against the biasing force to securely hold the frame against the boat side. The frame has a top wall member extending outward from the front surface of the base member. The first end of the clip arm is affixed along the front edge of the top wall member. The clip arm has a first portion that extends upward from the top wall, a second portion extending away from the front end of the top wall and a third portion which extends downwardly toward the back side of the base member to terminate at the free end of the clip arm. The clip arm extends a substantial distance above the top wall of the frame so that when the box is secured to the side of the boat, the top wall is beneath the gunnel of the boat. The present invention could also be attached to the transom of a boat.

In the preferred embodiment, the frame and clip arms are integrally molded of plastic while the elastomeric material may be made of foam rubber. Other suitable elastomeric materials are contemplated within the spirit and scope of the present invention to include both synthetic materials and natural rubber.

The present invention, thus, eliminates the disadvantages of the prior art in that it is a lure box that is securely fastened to the side of a boat to retain fishing lures in convenient access to the fisherman. The present invention is limited in the number of lures that it could retain only by virtue of its size. These and other advantages of my present invention will become apparent with reference to the accompanying drawings, detailed description of the preferred embodiment, and claims.

DETAILED DESCRIPTION OF THE PREFERRED EMBODIMENT

Figure 1:
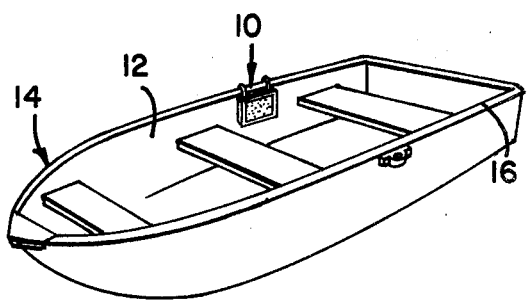
FIG. 1 is a view in perspective showing the fishing lure box of the present invention secured to the side of a boat.

Referring to the drawing, wherein like numerals represent like parts through the several views, the fishing lure box of the present invention, designated generally as 10 is illustrated in FIG. 1 secured to a side 12 of a boat 14. Fishing lure box 10 is designed in particular for attachment to boats beneath a top edge or gunnel 16 which projects into boat 14, as shown in particular in FIG. 4. Such boats include, for example, conventional canoes and small rowboats. It will be understood, however, that the fishing lure box 10 may also be attached to the transom of a boat.

Fishing lure box 10 includes a generally rectangular frame 18 having top and bottom wall members 20 and 22 and side wall members 24 and 26. Frame 18 also includes a base or back member 28 which is substantially planar and to which members 22-26 are affixed. Base member 28 has a front surface 30 and a rear surface 32. Affixed to front surface 20 by any suitable means, such as an adhesive, is a block 34 of elastomeric material. In the preferred embodiment, block 34 is formed of a foam rubber. It is understood, however, that alternative synthetic elastomers or natural rubber could be utilized to form block 34 and yet remain within the spirit and scope of the present invention.

Top member 20 of frame 18 has a top surface 36 which has a pair of resilient retaining arms or clips 38 and 40 affixed thereto. Arms 38 and 40 each have one end thereof affixed to top surface 36 proximate a front edge 42 of top member 20. Arms 38 and 40 have first portions 44 and 46 which extend generally upward from top surface 36. Arms 38 and 40 each have second generally curved portions 48 and 50 that extend generally rearwardly from first portions 44 and 46. Finally, arms 38 and 40 have third curved portions 52 and 54 which extend generally downward from second portions 48 and 50 toward rear surface 32. Third portions 52 and 54 terminate in free ends 56 and 58 which due to the resilient characteristics of arms 38 and 40 are normally biased into contact with rear surface 32. Ends 56 and 58 may be provided with integrally formed ridges (not shown) to provide a non-slip gripping surface.

Figure 4:
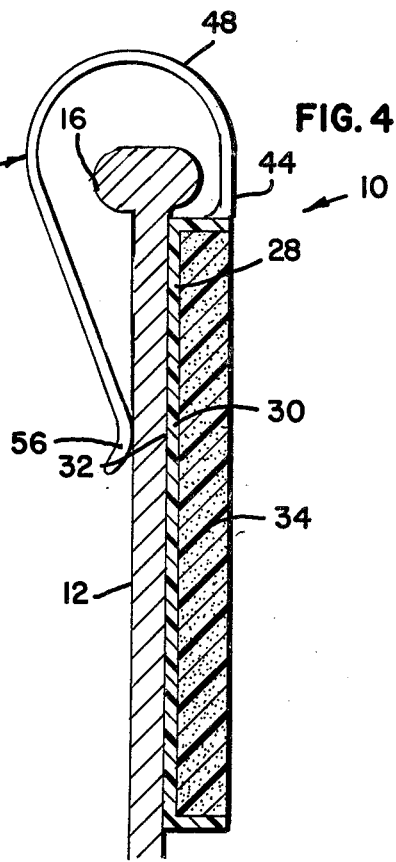
FIG. 4 is an enlarged fragmentary view taken generally along line 4—4 of FIG. 1.

As illustrated in particular in FIG. 4, first portions 44 and 46 and second portions 48 and 50 of arms 38 and 40 extend upward from top surface 36 and away from front edge 42 of frame 18 in a sufficient distance to provide adequate clearance for the top edge or gunnel 16 of side 12 of boat 14. In the preferred embodiment, therefore, top surface 36 lies beneath gunnel 16 when fishing lure box 10 is attached to side 12. Rear surface 32 of frame 18 is in contact with side 12. Free ends 56 and 58 and engage the outer surface of side 12. Fishing lure box 10 is placed on side 12 by simply sliding box 10 down over gunnel 16 and side 12 such that side 12 separates free ends 56 from their biased engagement with rear surface 32 of base member 28. The resilient characteristics of arms 38 and 40 serve to hold fishing lure box 10 in compressive contact against boat side 12. It can be seen in FIG. 4 that gunnel 16 serves to prevent fishing lure box 10 from being inadvertently kicked or knocked over the side of the boat. For example, if lure box 10 is accidentally struck in a manner such that it might have a tendency to be driven up over side 12, top member 20 will contact gunnel 16 which serves as a stop thereby preventing further upward travel of lure box 10.

Figure 2:
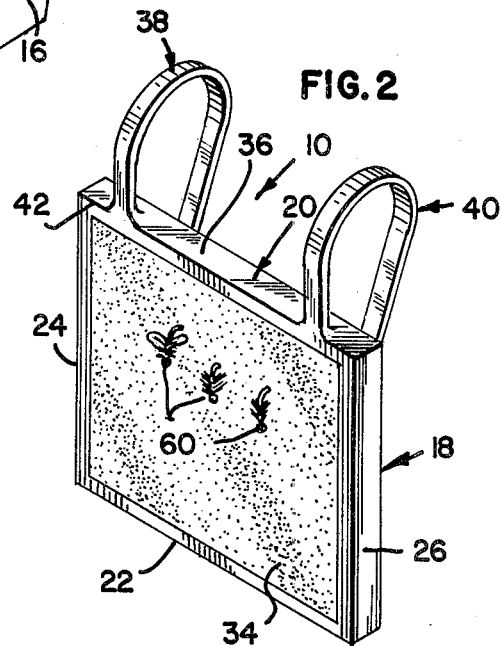
FIG. 2 is a front view in perspective of the present invention.
Figure 3:
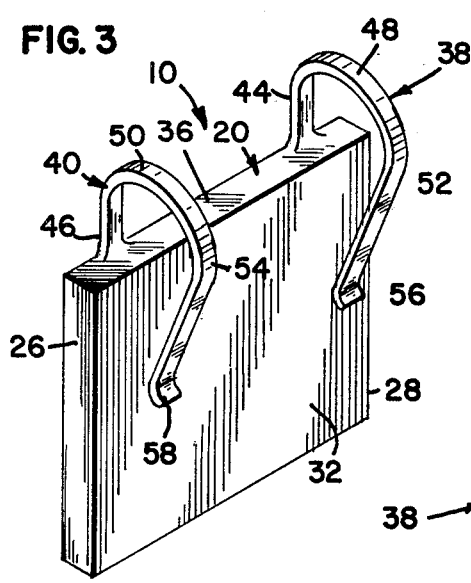
FIG. 3 is a rear view in perspective of the present invention.

As shown in FIG. 2, a plurality of fishing lures 60 may be placed with their hooks imbedded within block 34. The number of lures that can be so placed is limited merely by the size of block 34. It can be appreciated that block 34 will retain fishing lures 10 readily accessible to the fisherman in boat 14. Lures 60 are adequately separated so that they will not become entangled. When the fisherman desires to change lures, he simply removes the hook of the desired lure from block 34 and places the lure that he no longer desires to use within block 34.

In the preferred embodiment, frame 18 is formed of a molded plastic material. Additionally, arms 38 and 40 may be integrally molded with frame 18 or secured to top member 20 by any convenient fastening means. Lure box 10 is relatively inexpensive to manufacture and its replacement cost would be such that the fisherman may simply leave lure box 10 secured to side 12 of boat 14 after removing lures 60 therefrom when his fishing has ended. The fisherman would, therefore, not have to carry lure box 10 back and forth to his boat. On successive fishing trips, the fisherman may select a different set of lures 60 which he could then carry to the boat in any convenient manner, such as by tackle box which he could leave in his vehicle, and secured within block 34.

From the above description, it can be appreciated that the present invention is a fishing lure box designed to be firmly secured to the side of a fishing boat and having a foam material fishing lure support means maintaining selected fishing lures readily accessible. The foam material support means prevents the fishing lures from becoming entangled as in conventional tackle boxes. Since the lure box is designed to be attached to the side of the boat, additional room for people or other equipment is provided on the floor space of the boat. The present invention thus eliminates the disadvantages of the prior art tackle boxes which tend to get in the way on the floor of the boat. The fishing lure box of the present invention provides an inexpensive and convenient item of fishing equipment that is firmly and safely attached to the inside of the boat.

What is claimed is:

1. A fishing lure box adapted to be secured to the side of a boat for retaining lures having fish hooks in a position readily accessible to the fisherman, the boat having a gunnel about the sides thereof, comprising:

(a) a frame having a substantially planar base member having a top and bottom end and front and rear surfaces and a top wall extending outward from said planar base at said top end;

(b) a lure support member formed of elastomeric material affixed to said front surface of said base member so that said hook of said lures may be inserted within said elastomeric material; and (c) a resilient clip arm having a first end affixed to said top wall of said base member, said arm extending upward from said top wall such that said frame may be positioned beneath the gunnel and curving away from said top wall and generally toward said rear surface of said frame member with a relatively large radius of curvature to provide adequate clearance between said clip arm and the exterior surface of the gunnel, said clip arm then extending downward and toward said rear surface of the base member, said clip arm having an unstressed state in which the free end of said arm is biased against said rear surface and a stressed state wherein the boat side is disposed between the free end of said arm and rear surface of said base material so that the frame is positively engaged against the inside of the boat wall with said top wall below the gunnel.

2. A fishing lure box in accordance with claim 1, wherein said support member is a substantially rectangular block of elastomeric material affixed to said front surface of said base member.

3. A fishing lure box in accordance with claim 1 wherein said frame and said resilient clip arm are integrally molded of a plastic material.

4. A fishing lure box in accordance with claim 1 wherein said clip arm further comprises a plurality of resilient clip arms having first ends affixed to said frame and free second ends.

* * * * *